United States Patent
Lin et al.

(10) Patent No.: US 6,475,465 B2
(45) Date of Patent: Nov. 5, 2002

(54) TITANIUM-SILICALITE MOLECULAR SIEVE AND THE METHOD FOR ITS PREPARATION

(75) Inventors: Min Lin, Beijing (CN); Xingtian Shu, Beijing (CN); Xieqing Wang, Beijing (CN); Bin Zhu, Beijing (CN)

(73) Assignees: China Petrochemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 23 days.

(21) Appl. No.: 09/732,100

(22) Filed: Dec. 6, 2000

(65) Prior Publication Data

US 2001/0021369 A1 Sep. 13, 2001

(30) Foreign Application Priority Data

Dec. 24, 1999 (CN) .......................................... 99126289

(51) Int. Cl.[7] ............................ C01B 37/00; B01J 31/38
(52) U.S. Cl. ...................... 423/716; 423/713; 423/714; 423/715; 423/DIG. 22; 423/326; 423/598; 502/77; 502/85; 502/86; 502/242
(58) Field of Search ................................. 423/713, 714, 423/715, 716, 326, 598, DIG. 22; 502/77, 85, 86, 242

(56) References Cited

U.S. PATENT DOCUMENTS

| | | | | |
|---|---|---|---|---|
| 4,410,501 A | | 10/1983 | Taramasso et al. | |
| 5,525,323 A | * | 6/1996 | Mueller et al. | 423/705 |
| 5,683,952 A | * | 11/1997 | Onozawa et al. | 502/242 |
| 6,106,803 A | * | 8/2000 | Hasenzahl et al. | 423/705 |
| 6,319,486 B1 | * | 11/2001 | Mou et al. | 423/702 |

FOREIGN PATENT DOCUMENTS

| | | |
|---|---|---|
| CN | 1167082 A | 12/1997 |
| GB | 2 071 071 A | 11/1980 |

OTHER PUBLICATIONS

Thangaraj, A. et al. (Nov./Dec. 1992). "Studies on the synthesis of titanium silicalite, TS–1," *Zeolites* vol. 12:943–950.

* cited by examiner

*Primary Examiner*—David Sample
(74) *Attorney, Agent, or Firm*—Morrison & Foerster LLP

(57) ABSTRACT

The present invention relates to a titanium-silicalite (TS-1) molecular sieve and the method for preparation of the same, wherein each crystallite of said titanium-silicalite molecular sieve has a hollow cavity with a radial length of 5–300 nm. The benzene adsorption capacity of the molecular sieve determined at 25° C. and $P/P_0=0.10$ for 1 hour is at least 70 mg/g; and the method for preparation of said molecular sieve comprises an acid-treatment and then an organic-base treatment of the synthesized TS-1 molecular sieve, or only an organic-base treatment. The TS-1 molecular sieve of the present invention has a relatively high reactivity and activity stability in the catalytic oxidation.

23 Claims, 13 Drawing Sheets

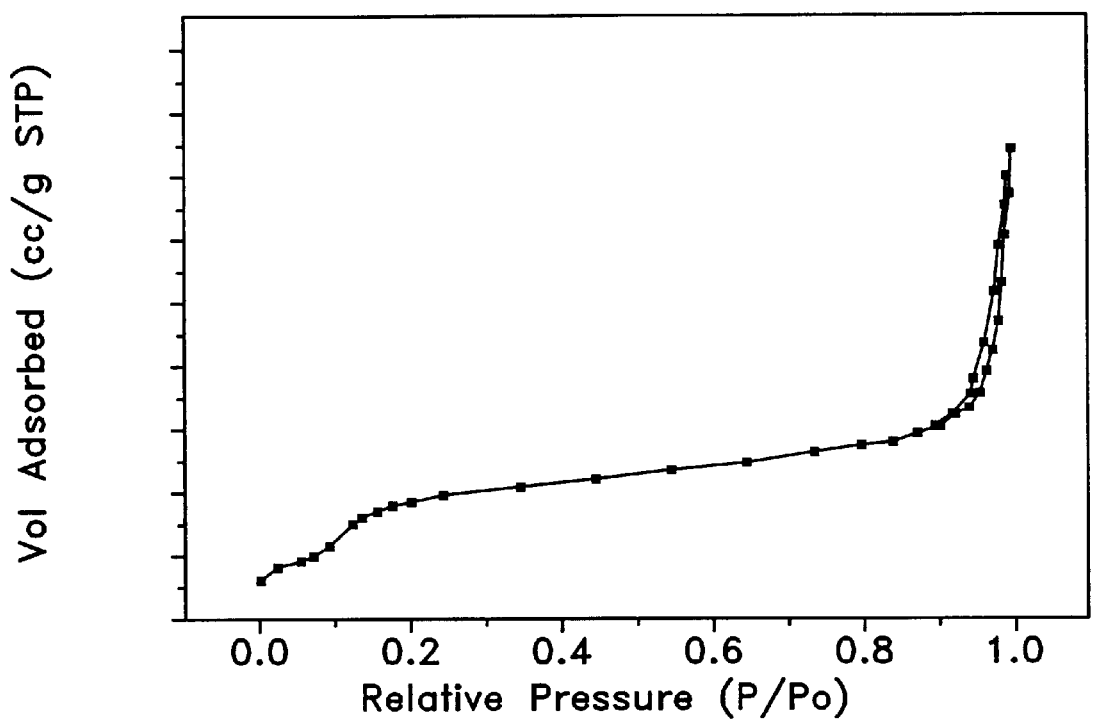
FIG. 14 Example 1
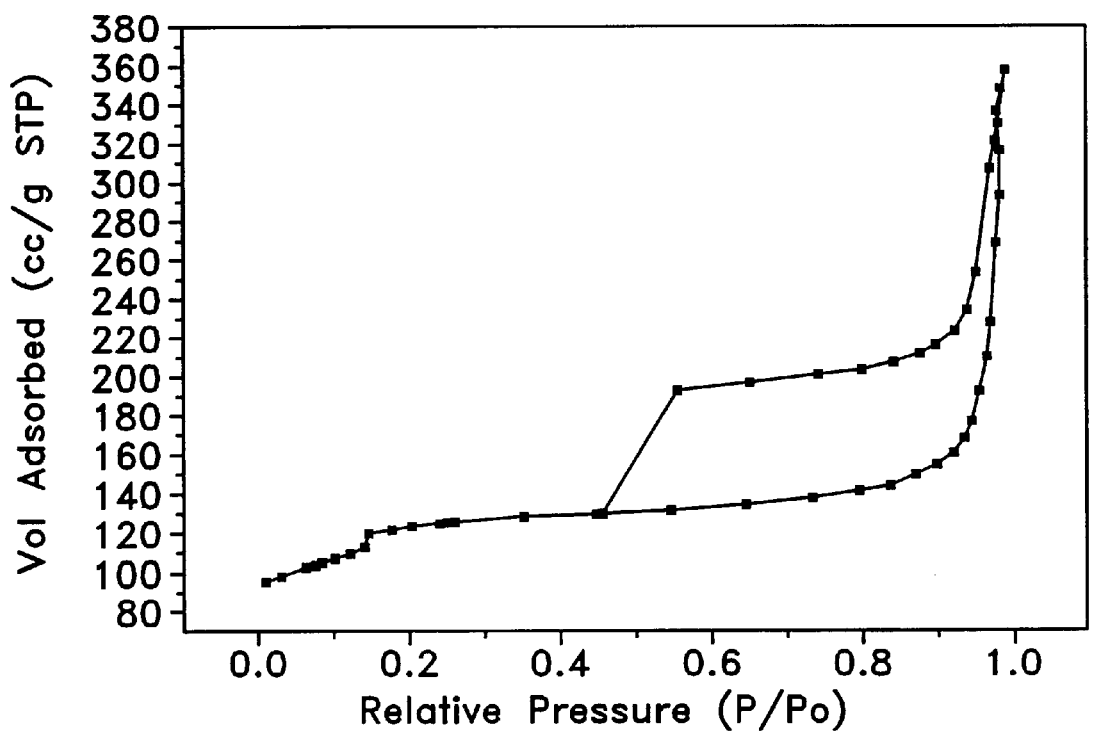
FIG. 15 Example 1

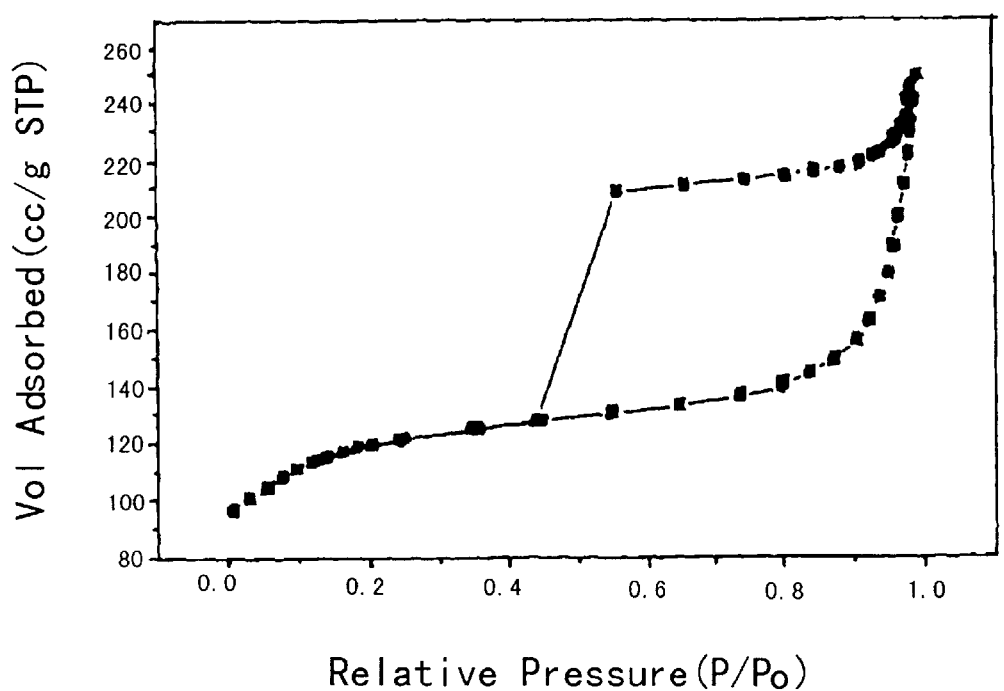
FIG. 16 Example 2
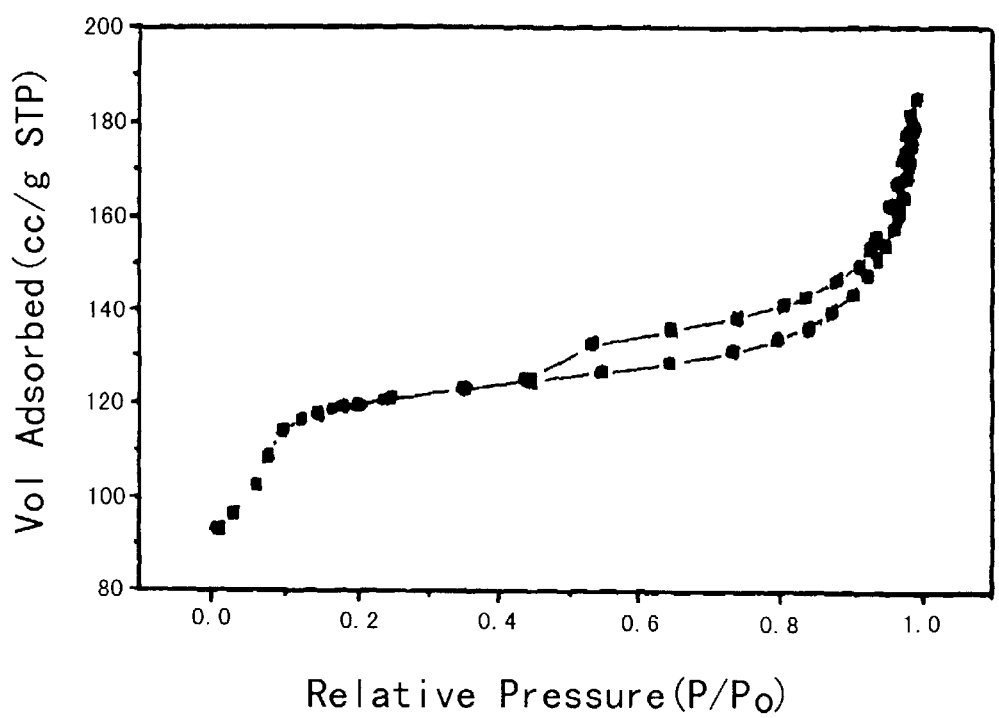
FIG. 17 Example 3

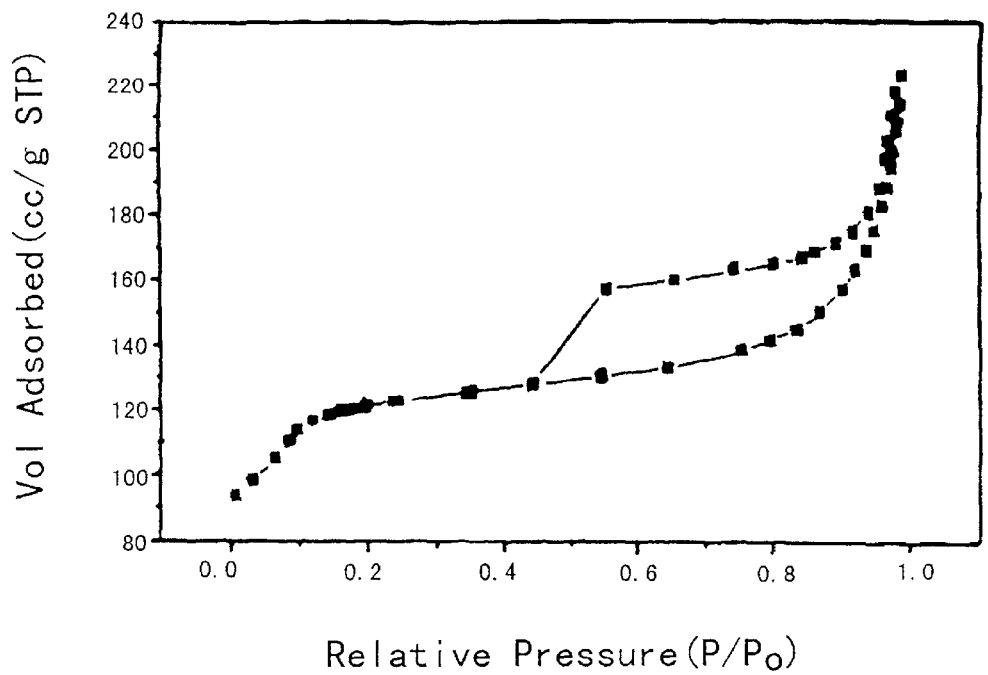
FIG. 18 Example 4
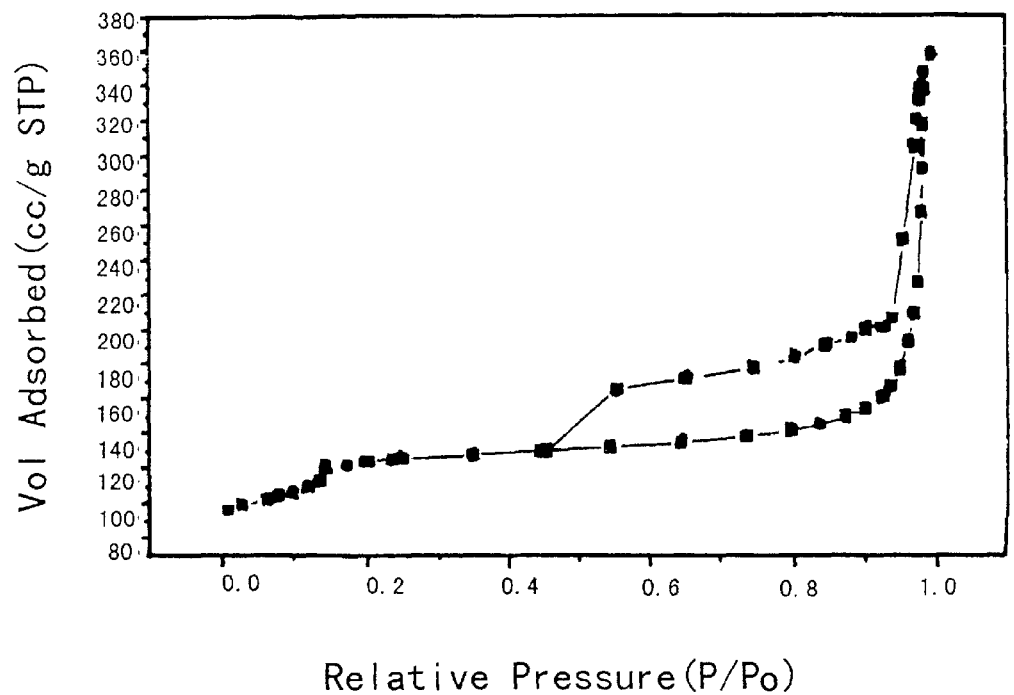
FIG. 19 Example 5

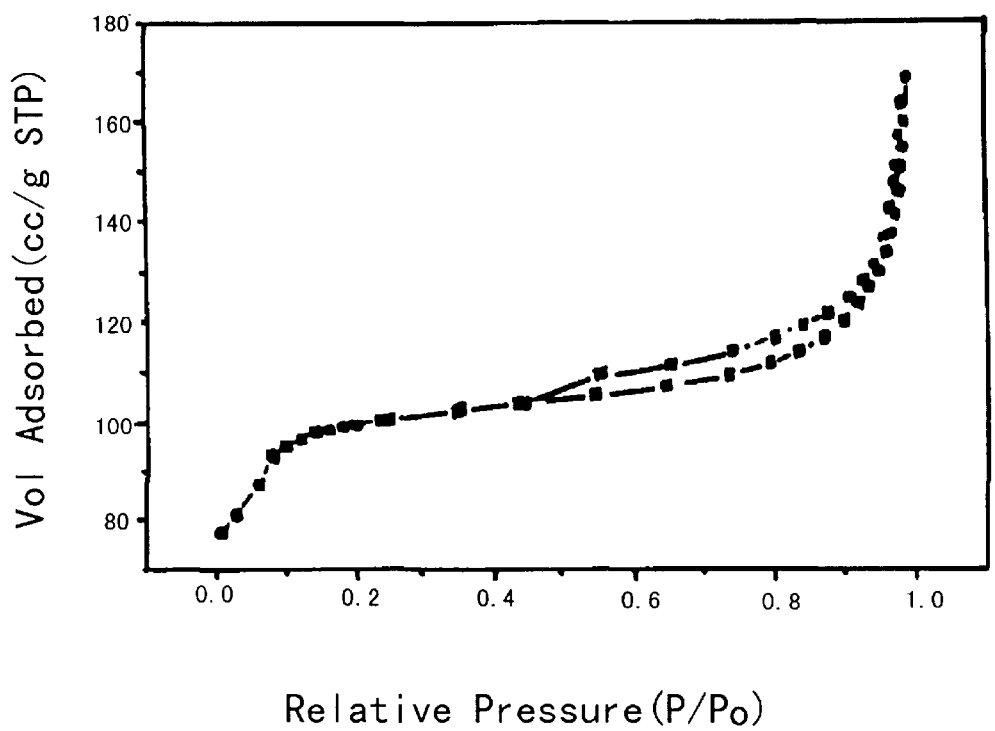
FIG. 20 Example 6
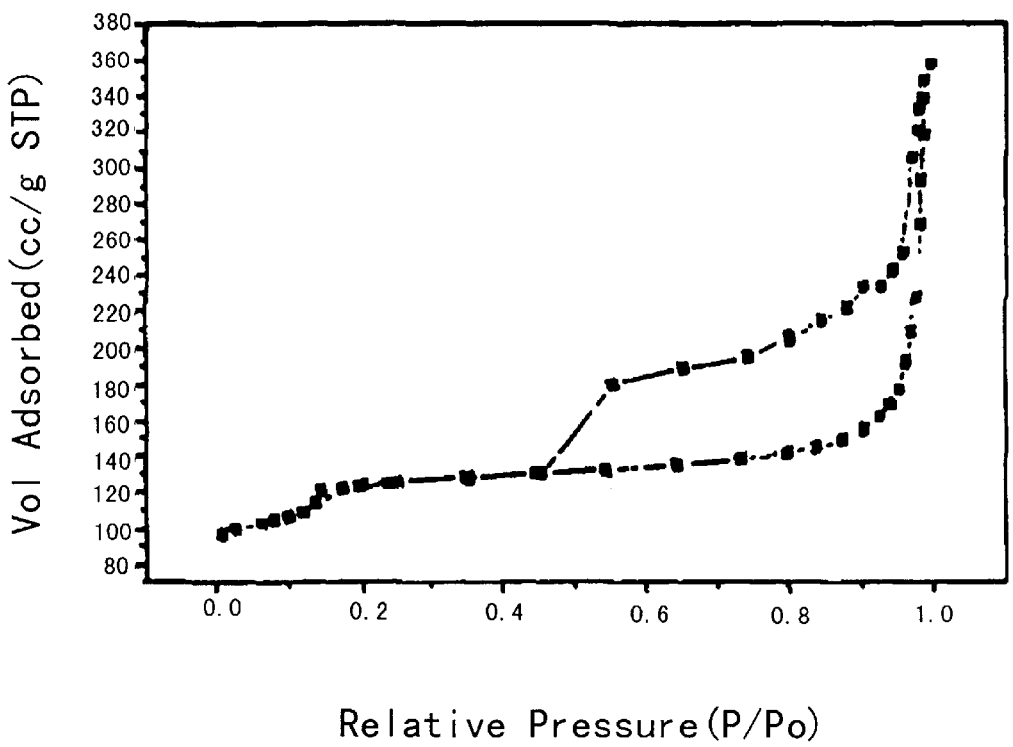
FIG. 21 Example 7

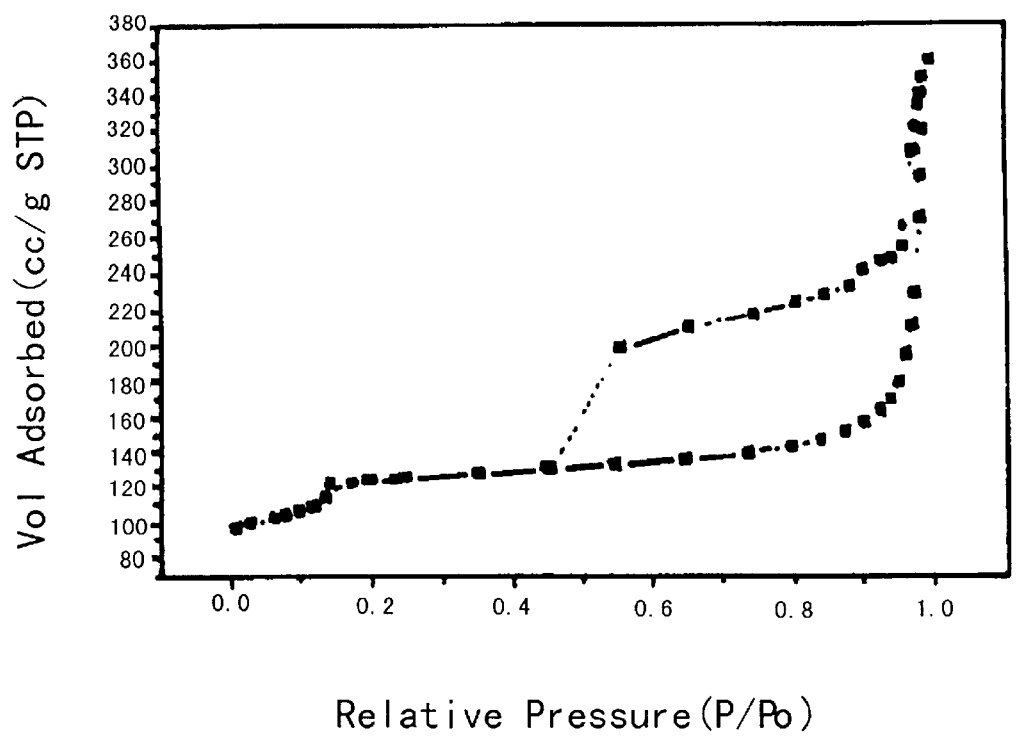
FIG. 22 Example 8
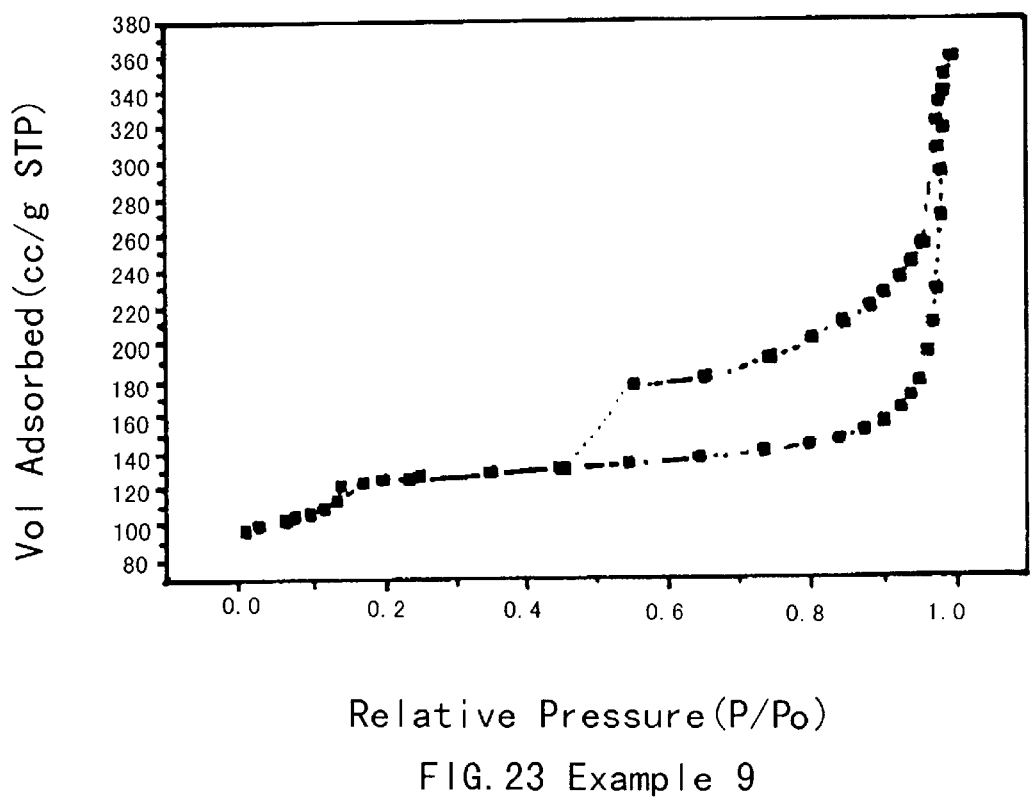
FIG. 23 Example 9

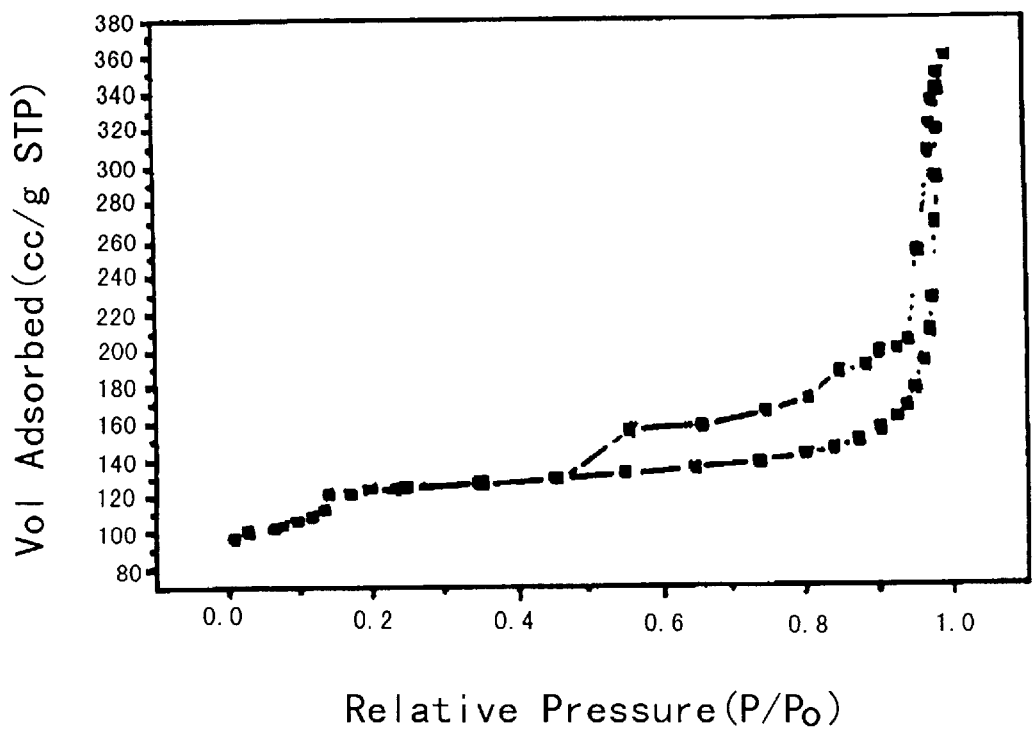
FIG. 24 Example 10
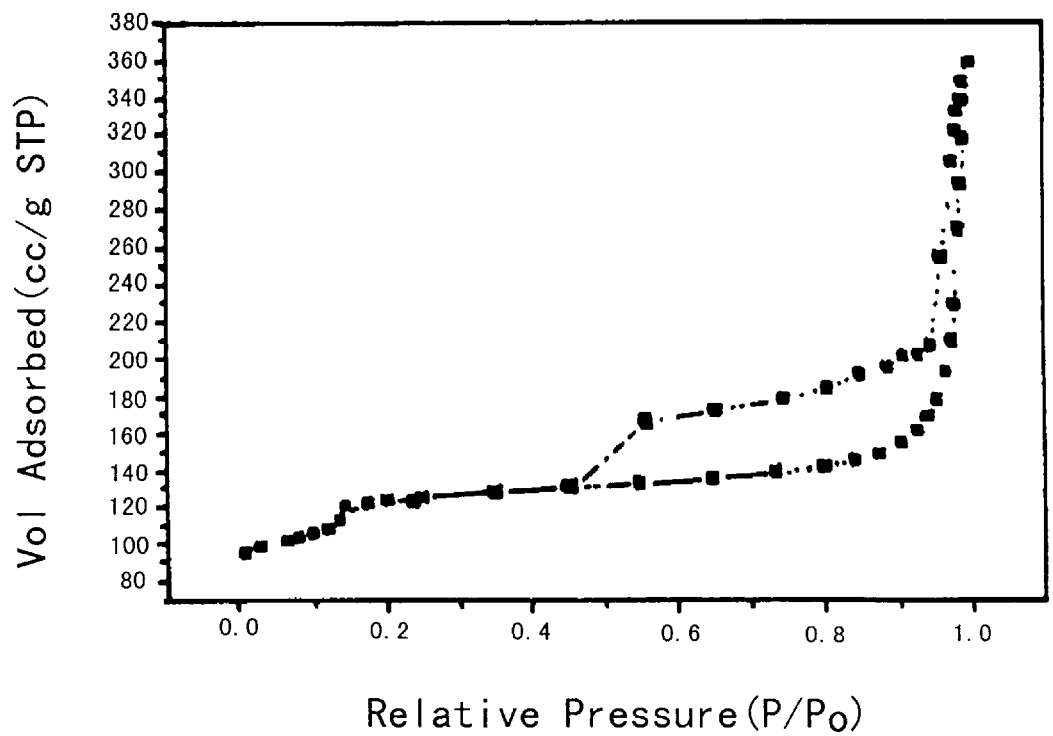
FIG. 25 Example 11

TITANIUM-SILICALITE MOLECULAR SIEVE AND THE METHOD FOR ITS PREPARATION

FIELD OF THE INVENTION

The invention relates to a titanium-silicalite molecular sieve and the method for the preparation of the same, specifically to a five-member ring titanium-silicalite molecular sieve with MFI structure (TS-1) and the method for preparation of the same.

BACKGROUND OF THE INVENTION

A crystalline titanium-silicalite molecular sieve is a novel heteroatom substituted silicalite molecular sieve, which was first reported in 1980s'. Now, a variety of titanium-silicalites have been reported, including TS-1 with MFI structure, TS-2 with MEL structure and TS-48 with a larger pore system. These molecular sieves can be applied to catalytic oxidation of different organic substrates, for example, epoxidation of olefins, hydroxylation of aromatics, oximation of cyclohexanol and oxidation of alcohols, and exhibit an excellent reactivity and selectivity in these catalytic oxidations. These crystalline titanium-silicalites used as redox molecular sieve catalysts have a prosperous future for applications in some industrial processes.

TS-1 molecular sieve is a synthetic, crystalline porous material having a structure similar to ZSM-5, obtained by substituting titanium for a partial silicon in the skeleton, which exhibits an excellent catalytic reactivity and selectivity in different oxidations attributed to coordination of the catalytic oxidation property in titanium and shape selectivity effects in ZSM-5 structure. Compared with the traditional oxidation reactions, $H_2O_2$ as the oxidant in all the oxidations catalyzed by TS-1 has the advantage of giving environmentally benign water as its by-product and operating simply. Hence, TS-1 makes it possible to develop new industrial processes.

Marco Taramasso et al first disclosed a process for synthesizing TS-1 in 1981 (GB 2,071,071A, U.S. Pat. No. 4,410,501). In their report, the preparation of TS-1 is based on the initial formation of a reaction mixture containing a silica source, a titanium source, an organic base (RN+) and/or an alkaline oxide($Me_{n/2}O$), followed by hydrothermal crystallization in an autoclave at 130–200° C. for 6–30 days. The final product TS-1 is obtained after filtration, washing, drying and calcination. The silicon source used is selected from tetra-alkyl ortho-silicate, or colloidal $SiO_2$, or an alkali metal silicate, and the titanium source used is selected from hydrolyzable titanium compounds, preferably $Ti(OC_2H_5)_4$. The organic base used is preferably tetra-propyl ammonium hydroxide. The reaction mixtures generally show a composition range in mol % as follows:

|  | Generally | Preferably |
|---|---|---|
| $SiO_2/TiO_2$: | 5~200 | 35~65 |
| $OH^-/SiO_2$: | 0.1~1.0 | 0.3~0.6 |
| $H_2O/SiO_2$: | 20~200 | 60~100 |
| $Me/SiO_2$: | 0~0.5 | 0 |
| $RN^+/SiO_2$: | 0.1~2.0 | 0.4~1.0 |

Thangaraj et al. indicated that titanium-content in the skeleton of the TS-1 molcular sieve synthesized by the above process was very low, and disclosed a TS-1 molecular sieve synthesis method for effectively increasing titanium content in the skeleton of the synthesized TS-1 molecular sieve(Zeolite, 1992, Vol. 12, p943–950). It was said that, by this method, the value of Si/Ti in the molecular sieve prepared by Taramasso's method could be reduced from 39 to 20. Thangaraj's method comprises: adding an appropriate amount of an aqueous solution of tetrapropyl ammonium hydroxide (TPAOH) into a tetraethyl silicate solution with stirring for a certain period of time to get the solution dissolved throughly, then adding an isopropanol solution of tetrabutyl titanate slowly under viogrous stirring to obtain a clear liquid mixture(said solution must be added slowly dropwise to prevent the formation of white $TiO_2$ precipitate due to quick hydrolysis of tetrabutyl titanate); after stirring for 15 minutes, adding another appropriate amount of an aqueous TPAOH solution slowly, then displacing alcohol in the reaction mixture under 75–80° C. for 3–6 hours, and afterwords transferring the mixture into an autoclave to undergo hydrothermal crystallization under 170° C. for 3–6 days, and after drying to obtain the TS-1 molecular sieve. In the process, the reaction mixture shows a composition in molecular ratio as follows;

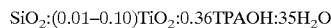

$SiO_2:(0.01–0.10)TiO_2:0.36TPAOH:35H_2O$

Du et al in CN1167082A discloses a method for preparation of a TS-1 molecular sieve, comprising: dissolving a titanium source in an aqueous TPAOH solution, and mixing with solid silica gel pellets homogeneously to obtain a reaction mixture, then undergoing hydrothermal crystallization in an autoclave under 130–200° C. for 1–6 days, and afterwards filtrating, washing, drying and calcining the mixture by conventional processes.

The above-metioned methods in the prior art for synthesizing the TS-1 molecular sieves have drawbacks mainly in that, in the course of process, a relatively large portion of stagnant Ti is formed as ex-skeleton Ti remaining in the pore channels of the molecular sieves, this portion of ex-skeleton Ti cannot play an effective role in the catalytic oxidation, but will cause decomposition of the oxidant($H_2O_2$). Consequently, the TS-1 molecular sieves prepared by the above methods exhibit low catalytic oxidation activity, and moreover, due to unstable content of ex-skeleton Ti, TS-1 molecular sieves having good catalytic oxidation activity can hardly be obtained steadily, so the TS-1 molecular sieves obtained are generally inferior in activity stability, which handicaps the industrial application of the TS-1 molecular sieve in the prior art.

DISCLOSURE OF THE INVENTION

The object of this invention is to provide a novel titanium-silicalite molecular sieves (TS-1) with MFI structure, particularly having a unique morphology of crystallite and showing good catalytic reactivity and stability in oxidations. Another object of the invention is to provide a method for the preparation of the said titanium-silicalite molecular sieve.

The titanium-silicalite molecular sieve provided by the invention is characterized by crystallites with hollow struture, in which the hollow cavity of each crystallite has a radial length in the range of 5~300 nm, preferable 10~200 nm. The benzene adsorption capacity of said titanium-silicalite sample tested at 25° C. and $P/P_0=0.10$ for 1 h is at least 70 mg/g, preferably at least 80 mg/g.

Said titanium-silicalite molecular sieve provided by the invention is also characterized by that the cavity shape of said titanium-silicalite crystallite can be varied, such as in circular, or rectangular, or irregularly polygonal, or irregularly circular, or a combination of these shapes.

The grains of the titanium-silicalite molecular sieve with MFI structure provided by the invention are composed of individual hollow crystallites or aggregated crystallites as a result of aggregation of the hollow crystallites.

Said titanium-silicalite molecular sieve provided by the invention is also characterized by that there is an obvious hysteresis loop between the low-temperature $N_2$ adsorption isotherm and desorption isotherm of said molecular sieve, while generally there is not any hysteresis loop between those isotherms of the conventional titanium-silicalite. The applicants in their research found that the hysteresis loop is related to the hollow cavity structure in the crystallites of said titanium-silicalite molecular sieve. The bigger the hollow cavity in the crystallites, the larger the said hysteresis loop.

The $SiO_2$: $TiO_2$ molar ratio of said titanium-silicalite molecular sieve of the invention ranges from 5 to 500, preferably from 10 to 200.

The first method for the preparation of said titanium-silicalite molecular sieve provided by the invention comprises the following steps:

(1) Mixing a sythesized TS-1 with an acidic compound and water homogenously, and letting the mixture react at 5–95° C. for 5–360 min., preferably at 15–60° C. for 10–180 min. to obtain an acid-treated TS-1;

(2) Mixing the acid-treated TS-1 obtained in step 1 with an organic base and water homogenously, then transferring the mixture to a autoclave to react at 120–200° C. under autogenous pressure for 1–192 hr., preferably at 150–180° C. under antogenous pressure for 2–120 hr, then filtrating, washing, drying and calcining the resultant to obtain the TS-1.

In the first method according to the present invention, step 1 and step 2 may be repeated once or several times respectively, or only step 2 is repeated once or several times, so as to further enlarge the hollowness in the crystallites, reduce the amount of ex-skeleton $TiO_2$ and improve the catalytic reactivity of the TS-1 molecular sieve.

Said TS-1 used in step 1 of the first method of the present invention can be a synthesized TS-1 prepared by any method of the prior art, which can be as-synthesized or calcined, i.e. with or without an organic template, preferably calcined and with the organic template removed.

Said acidic compound used in step 1 of the first method is selected from organic acid compounds, such as an aliphatic acid $R^1(COOH)_n$, wherein $R^1$ is a $C_{1-4}$-alkyl, and n is 1 or 2; or inorganic mineral acids; such as hydrochloric acid, sulfuric acid, phosphoric acid, nitric acid and hydrofluoric acid; or acidic salt compounds, such as ammonium chloride, ammonium phosphate, ammonium nitrate, ammonium sulfate and ammonium fluoride; preferably inorganic acid.

The ratio of molecular sieve to acidic compound to water used in step 1 of the first method is: molecular sieve (g): acidic compound (mol): water (mol)=100:(0.010–2.0):(5–250), preferably 100:(0.080–0.80):(10–100).

The organic base used in step 2 of the first method of the present invention is selected from the group consisting of aliphatic amines, alkylol amines, quaternary ammonium bases, or mixtures of these compounds, preferably alkylol amines, or quaternary ammonium bases or mixtures of these compounds; most preferably quaternary ammonium bases or mixtures of the organic base and quaternary ammonium bases.

Said aliphatic amines have a general formula of $R^2(NH_2)_n$, wherein $R^2$ is a $C_{1-6}$-alkyl, and n is 1 or 2, preferably ethyl amine, n-butyl amine, butanediamine, or hexanediamine.

Said alkylol amine compounds have a general formula of $(HOR^3)_mN$, wherein $R^3$ is a $C_{1-4}$-alkyl, and m is from 1 to 3, preferably mono ethanolamine, diethanolamine or triethanolamine.

Said quaternary ammonium bases have a general formula of $R^4_4NOH$, wherein $R^4$ is a $C_{1-4}$-alkyl, preferably a $C_{2-4}$-alkyl, more preferably propyl.

The ratio of molecular sieve to organic base to water used in step 2 of the first method is: molecular sieve (g): organic base (mol.): water (mol)=100:(0.005–0.50):(5–200), preferably 100:(0.010–0.15):(20–80).

The second method for the preparation of said titanium-silicalite (TS-1) molecular sieve according to the present invention is characterized in that the method comprises that a synthesized TS-1 molecular sieve having a MFI structure prepared by conventional method is mixed with an organic base and water homogenously, then the mixture is transferred to a sealed reaction vessel to react at 120–200° C. under autogenous pressure for 1–192 h, preferably at 150–180° C. for 2–120 h, and then the reaction product is recovered. Compared with the first method, the second method is different in that it saves the step of acid treatment and treats the above-said synthesized TS-1 molecular sieve having a MFI-structure with an organic base directly, wherein said organic base and its amount used are the same as the afore-mentioned. In the second method, the organic base treatment can be repeated once or several times.

The hollow cavity in the crystallite of said TS-1 molecular sieve product obtained by the first method is larger than that produced by the second method, while the second method can also achieve the object of the invention.

DESCRIPTION OF THE DRAWING

FIGS. 14–25 are low-temperature $N_2$ adsorption-desorption isotherms of samples taken from comparative example 1, and examples 1–11 respectively.

According to the methods of this invention, the adoption of acid-base treatment and/or organic base treatment has enabled the ex-skeleton Ti to re-enter the skeleton of the TS-1 molecular sieve, thus the amount of ex-skeleton $TiO_2$ is reduced, while the amount of effective Ti in the skeleton is increased, and as a result, the reactivity of the titanium-silicalite molecular sieve in catalytic oxidation is obviously higher than that prepared by the prior art (see Example 12) and its activity stability is better (see Example 13). Besides, the thin-wall and hollow-cavity structure of the crystallites of said TS-1 molecular sieve of the invention favors the diffusion of the molecules, particularty the larger molecules among the reactants (e.g. the aromatic compounds) and reaction products in the catalytic reactions, especially in the catalytic oxidations of the aromatic or cyclic compounds.

The invention will be further described in combination with various specific Examples. In the following examples, TPAOH was the product of Tokyo Kasei Organic Chemicals, the other regents were all the commercial products. The transmission electron microscopic images of the titanium-silicalites were taken with a JEM-2000 FX-II transmission electron microscope (TEM) of Japan Electron Corporation. Benzene adsorption capacity was measured by the routine static adsorption method. Determination of the low-temperature $N_2$ adsorption-desorption isotherms was carried out according to ASTM D4222-98 standard method.

COMPARATIVE EXAMPLE 1

This comparative example demonstrates the effect of a TS-1 molecular sieve synthesized in accordance with the procedure reported in the reference (Zeolite, vol. 12, 1992, pages 943–950), which was different from the method of this invention.

22.5 g of TEOS (tetraethyl orthosilicate) was mixed with 7.0 g of TPAOH solution and 59.8 g of distilled water thoroughly. After hydrolyzing at 60° C. under atmospheric pressure for 1.0 h, a TEOS hydrolyzed solution was obtained. To the resultant solution, a solution composed of 1.1 g of tetrabutyl titanate and 5.0 g of anhydrous isopropanol was added slowly with stirring vigorously. The mixture obtained was stirred at 75° C. for 3 h to obtain a clearly transparent colloid, which was transferred to a stainless steel autoclave and was shelved under autogenous pressure at 170° C. with the temperature being kept constant for 6 days, thereafter the mixture of crystallization resultants thus obtained was filtered, washed with distilled water till pH=6–8, dried at 10° C. for 1 h, thus the as-synthesized TS-1 raw powder was obtained. The as-synthesized TS-1 raw powder was calcined at 550° C. in air for 4 h, thus the TS-1 molecular sieve was obtained.

Figure 2:
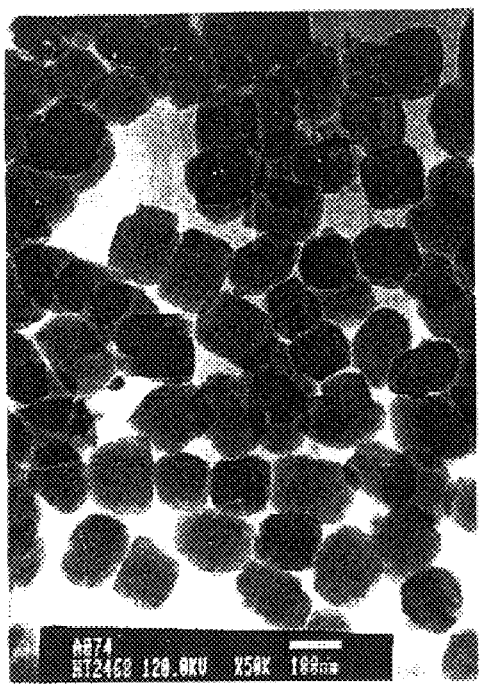
FIGS. 2–13 are transmission electron microscopic (TEM) images of the samples taken from comparative example 1, and examples 1–11 respectively.

Transmission electron microscopic (TEM) image (magnification 50,000:1)is shown in FIG. 2.

Low-temperature $N_2$ adsorption-desorption isotherms are shown in FIG. 14.

Figure 1:
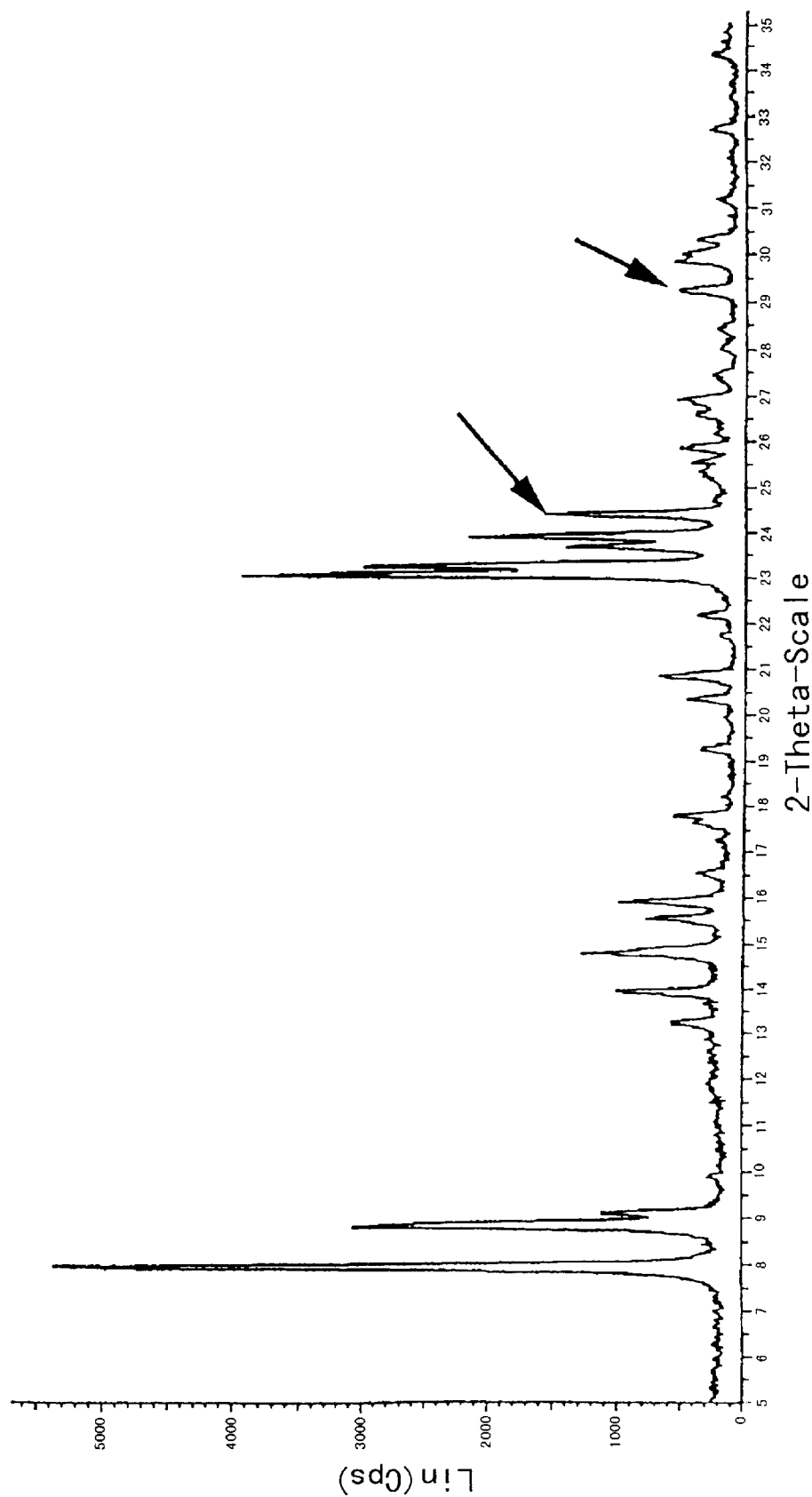
FIG. 1 shows the XRD crystalline phase diagram of the sample obtained in example 1.

X-ray diffraction crystalline phase diagram is similar to the pattern as shown in FIG. 1.

EXAMPLE 1

The TS-1 molecular sieve obtained in Comparative Example 1 was mixed homogenously with a sulfuric acid solution and water in a ratio of molecular sieve (g):sulfuric acid (mol):water (mol)=100:0.15:150. Then, the mixture was reacted at 90° C. for 5.0 h. After filtration, washing and drying by routine methods, an acid-treated TS-1 molecular sieve was obtained.

Said acid-treated TS-1 was mixed with triethanolamine, TPAOH and water in a ratio of molecular sieve (g):triethanolamine (mol):TPAOH (mol):water (mol)=100:0.20:0.15:180. Then, the mixture was transferred to a stainless steel autoclave and the reaction was carried out under autogenous pressure at 190° C. with the temperature being kept constant for 12 h. After cooling and pressure unloading, routine filtration, washing, drying and calcination at 550° C. in air for 3 h, the modified TS-1 molecular sieve of this invention was obtained.

Figure 3:
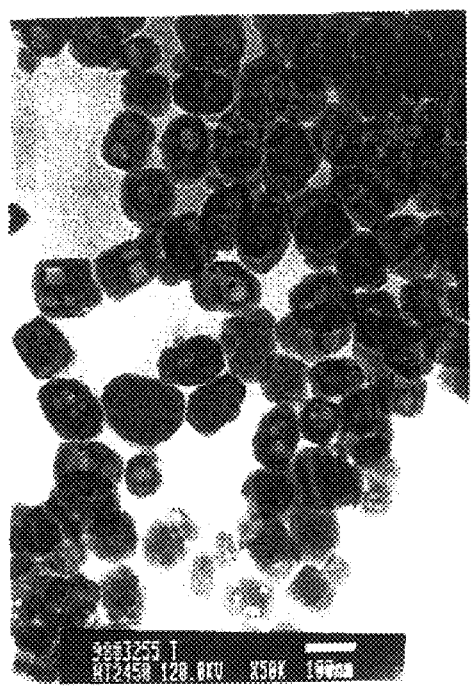

Transmission electron microscopic (TEM) image (magnification 50,000:1)is shown in FIG. 3.

Low-temperature $N_2$ adsorption-desorption isotherms are shown in FIG. 15.

An X-ray diffraction crystalline phase diagram is shown in FIG. 1. The machine for taking the X-ray diffraction crystalline phase diagram is "Brunker D5005" made in Germany.

EXAMPLE 2

The TS-1 molecular sieve obtained in Comparative Example 1 was mixed homogenously with a hydrofluoric acid solution and water in a ratio of molecular sieve (g):hydrofluoric acid (mol):water (mol)=100:0.25:60. Then the mixture was reacted at 50° C. for 3.0 h. After routine filtration, washing and drying, an acid-treated TS-1 molecular sieve was obtained.

Said acid-treated TS-1 molecular sieve was mixed homogenously with TPAOH and water in a ratio of molecular sieve (g):TPAOH (mol):water (mol)=100:0.010:80. Then the mixture was transferred to a stainless steel autoclave and was shelved under autogenous pressure at 170° C. with the temperature being kept constant for 24 h. After cooling and pressure unloading, routine filtration, washing, drying and calcination at 550° C. in air for 3 h, the modified TS-1 molecular sieve of this invention was obtained.

Figure 4:
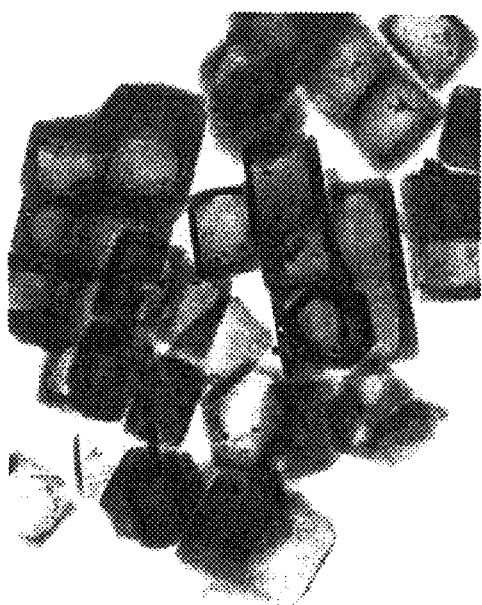

Transmission electron microscopic (TEM) image (magnification 50,000:1 )is shown FIG. 4.

Low-temperature $N_2$ adsorption-desorption isotherms are shown FIG. 16.

X-ray diffraction crystalline phase diagram is similar to the pattern in FIG. 1.

EXAMPLE 3

The TS-1 molecular sieve obtained in Comparative Example 1 was mixed homogenously with a phosphoric acid solution and water in a ratio of molecular sieve (g):phosphoric acid (mol):water (mol)=100:1.55:250. Then, the mixture was reacted at 68° C. for 0.3 h. After routine filtration, washing and drying, an acid-treated TS-1 molecular sieve was obtained.

Said acid-treated TS-1 molecular sieve was mixed homogenously with hexanediamine and water in a ratio of molecular sieve (g):hexanediamine (mol):water (mol)=100:0.50:200. Then the mixture was transferred to a stainless steel autoclave and was shelved under autogenous pressure at 140° C. with the temperature being kept constant for 6 days. After cooling and pressure unloading, routine filtration, washing, drying and calcination at 550° C. in air for 3 h, the modified TS-1 molecular sieve of this invention was obtained.

Figure 5:
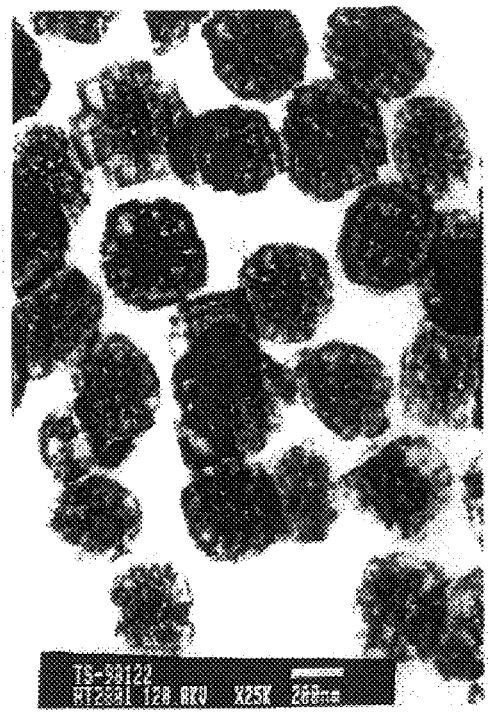

Transmission electron microscopic (TEM) image (magnification 25,000:1)is shown in FIG. 5.

Low-temperature $N_2$ adsorption-desorption isotherms are shown in FIG. 17.

X-ray diffraction crystalline phase diagram is similar to the pattern in FIG. 1.

EXAMPLE 4

The TS-1 molecular sieve obtained in Comparative Example 1 was mixed homogenously with a ammonium nitrate solution and water in a ratio of molecular sieve (g):ammonium nitrate (mol):water (mol)=100:3.25:200. Then the mixture was reacted at ambient temperature (25° C.) for 1.5 h. After routine filtration, washing and drying, an acid-treated TS-1 molecular sieve was obtained.

Said acid-treated TS-1 molecular sieve was mixed homogenously with n-butyl amine and water in a ratio of molecular sieve (g):n-butyl amine (mol):water (mol)=100:0.18:30. Then, the mixture was transferred to a stainless steel autoclave and was shelved under autogenous pressure at 160° C. with the temperature being kept constant for 4 days. After cooling and pressure unloading, routine filtration, washing, drying and calcination at 500° C. in air for 4 h, the modified TS-1 molecular sieve of this invention was obtained.

Figure 6:
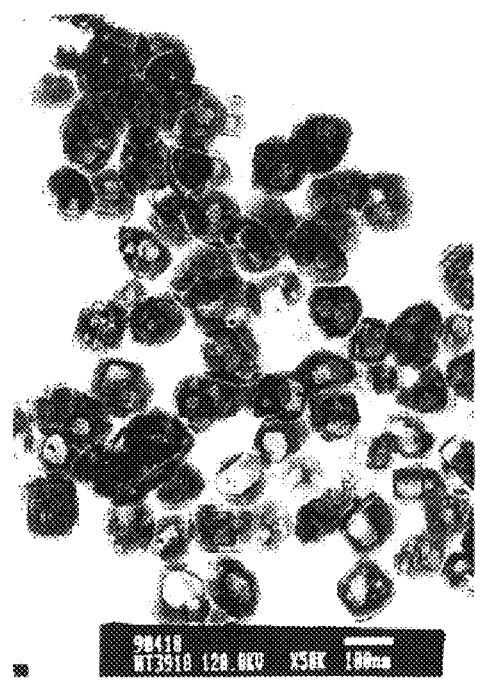

Transmission electron microscopic (TEM) image (magnification 50,000:1)is shown FIG. 6.

Low-temperature $N_2$ adsorption-desorption isotherms are shown FIG. 18.

X-ray diffraction crystalline phase diagram is similar to the pattern in FIG. 1.

EXAMPLE 5

An as-synthesized TS-1 molecular sieve raw powder obtained in Comparative Example 1 was mixed homogenously with a hydrochloric acid solution and water in a ratio of molecular sieve (g):hydrochloric acid (mol):water (mol)=100:0.75:260. Then, the mixture was reacted at 15° C. for 6.0 h. After routine filtration, washing and drying, an acid-treated TS-1 molecular sieve was obtained.

Said acid-treated TS-1 molecular sieve was mixed homogenously with butanediamine and water in a ratio of molecular sieve (g):butanediamine (mol):water (mol)= 100:0.30:10. Then, the mixture was transferred to a stainless steel autoclave and was shelved under autogenous pressure at 155° C. with the temperature being kept constant for 3 days. After cooling and pressure unloading, routine filtration, washing, drying and calcination at 600° C. in air for 2 h, the modified TS-1 molecular sieve of this invention was obtained.

Figure 7:

Transmission electron microscopic (TEM) image (magnification 50,000:1)is shown in FIG. 7.

Low-temperature $N_2$ adsorption-desorption isotherms are shown in FIG. 19.

X-ray diffraction crystalline phase diagram is similar to the pattern in FIG. 1.

EXAMPLE 6

The TS-1 molecular sieve obtained in Comparative Example 1 was mixed homogenously with an oxalic acid solution and water in a ratio of molecular sieve (g):oxalic acid (mol):water (mol)=100:4.5:30. Then, the mixture was reacted at 80° C. for 2.5 h. After routine filtration, washing and drying, an acid-treated TS-1 molecular sieve was obtained.

Said acid-treated TS-1 molecular sieve was mixed homogenously with diethanolamine and water in a ratio of molecular sieve (g):diethanolamine (mol):water (mol)= 100:0.30:50. Then, the mixture was transferred to a stainless steel autoclave and was shelved under autogenous pressure at 165° C. with the temperature being kept constant for 2 days. After cooling and pressure unloading, routine filtration, washing, drying and calcination at 550° C. in air for 3 h, the modified TS-1 molecular sieve of this invention was obtained.

Figure 8:
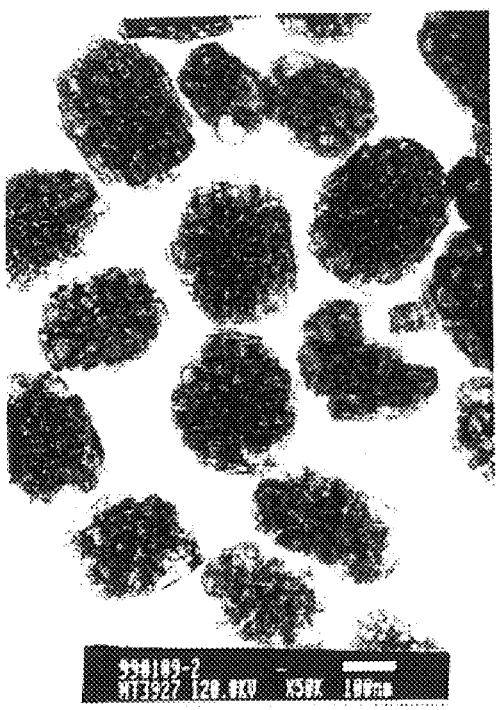

Transmission electron microscopic (TEM) image (magnification 50,000:1) is shown in FIG. 8.

Low-temperature $N_2$ adsorption-desorption isotherms are shown in FIG. 20.

X-ray diffraction crystalline phase diagram is similar to the pattern in FIG. 1.

EXAMPLE 7

The TS-1 molecular sieve obtained in Comparative Example 1 was mixed homogenously with an ammonium fluoride solution and water in a ratio of molecular sieve (g):ammonium fluoride (mol):water (mol)=100:0.05:80. Then the mixture was reacted at 35° C. for 4.5 h. After routine filtration, washing and drying, an acid-treated TS-1 molecular sieve was obtained.

Said acid-treated TS-1 molecular sieve was mixed homogenously with tetraethylammonium hydroxide and water in a ratio of molecular sieve (g):tetraethylammonium hydroxide (mol):water (mol)=100:0.25: 60. Then, the mixture was transferred to a stainless steel autoclave and was shelved under autogenous pressure at 175° C. with the temperature being kept constant for 3 days. After cooling and pressure unloading, routine filtration, washing, drying and calcination at 550° C. in air for 3 h, the modified TS-1 molecular sieve of this invention was obtained.

Figure 9:
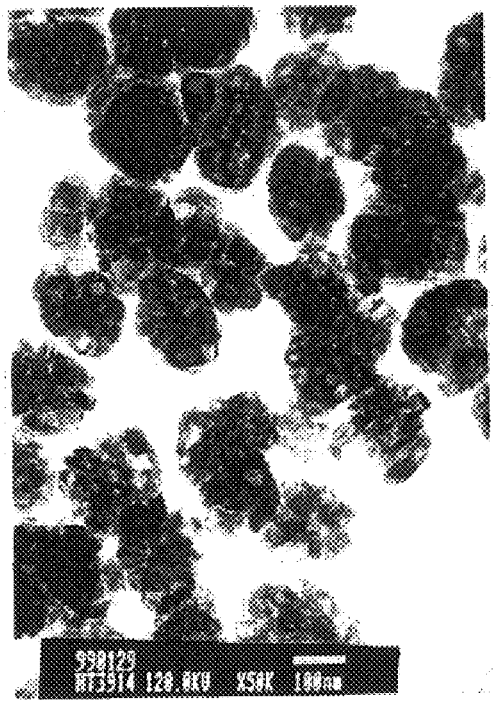

Transmission electron microscopic (TEM) imagic (magnification 50,000:1)is shown in FIG. 9.

Low-temperature $N_2$ adsorption-desorption isotherms are shown in FIG. 21.

X-ray diffraction crystalline phase diagram is similar to the pattern in FIG. 1.

EXAMPLE 8

The procedures of Example 7 were repeated except for the the TS-1 obtained in Example 7 was used instead of the TS-1 molecular sieve obtained in the comparative Example 1, and then the modified TS-1 molecular sieve by the acid and base treatments more than once according to this invention was obtained.

Figure 10:
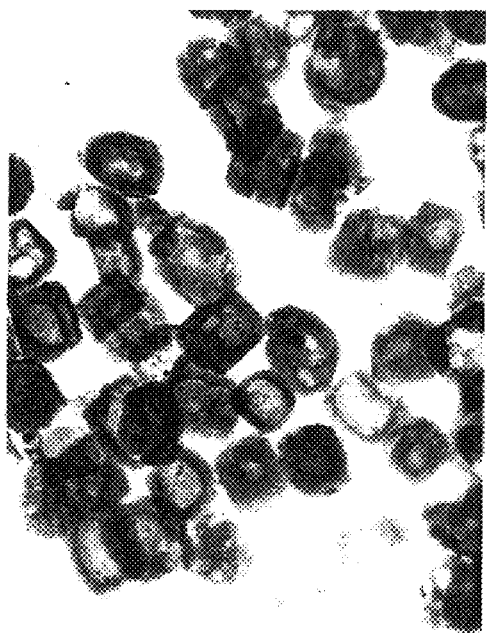
Figure 11:
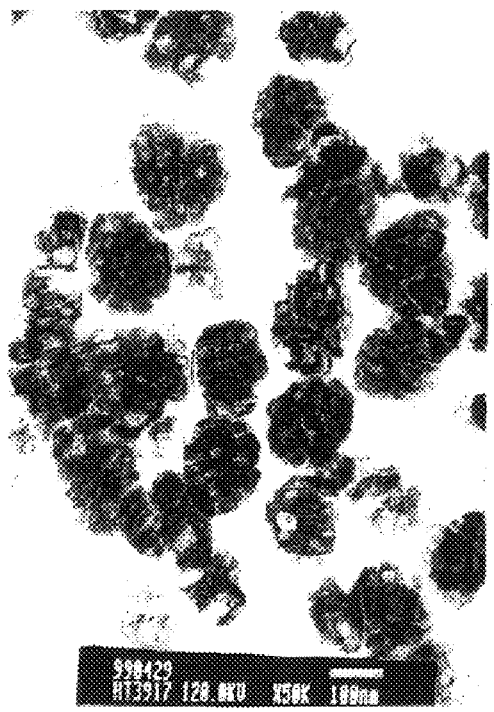

Transmission electron microscopic (TEM) image (magnification 50,000:1)is shown in FIG. 10.

Low-temperature $N_2$ adsorption-desorption isotherms are shown in FIG. 22.

X-ray diffraction crystalline phase diagram is similar to the pattern in FIG. 1.

EXAMPLE 9

The TS-1 molecular sieve obtained in Comparative Example 1 was mixed homogenously with tetraethylammonium hydroxide and water in a ratio of molecular sieve (g):tetraethylammonium hydroxide (mol):water (mol)= 100:0.25:60. Then, the mixture was transferred to a stainless steel autoclave and was shelved under autogenous pressure at 175° C. for 3 days. After cooling and pressure unloading, routine filtration, washing, drying and calcination at 550° C. in air for 3 h, the modified TS-1 molecular sieve of this invention was obtained.

Transmission electron microscopic (TEM) image (magnification 50,000:1)is shown in FIG. 1.

Low-temperature $N_2$ adsorption-desorption isotherms are shown in FIG. 23.

X-ray diffraction crystalline phase diagram is similar to the pattern in FIG. 1.

EXAMPLE 10

The TS-1 molecular sieve obtained in Comparative Example 1 was mixed homogenously with triethanolamine and water in a ratio of molecular sieve (g):triethanolamine (mol):water (mol)=100:0.25:60. Then, the mixture was transferred to a stainless steel autoclave and was shelved under autogenous pressure at 150° C. for 3 days. After cooling and pressure unloading, routine filtration, washing, drying and calcination at 550° C. in air for 3 h, the modified TS-1 molecular sieve of this invention was obtained.

Figure 12:
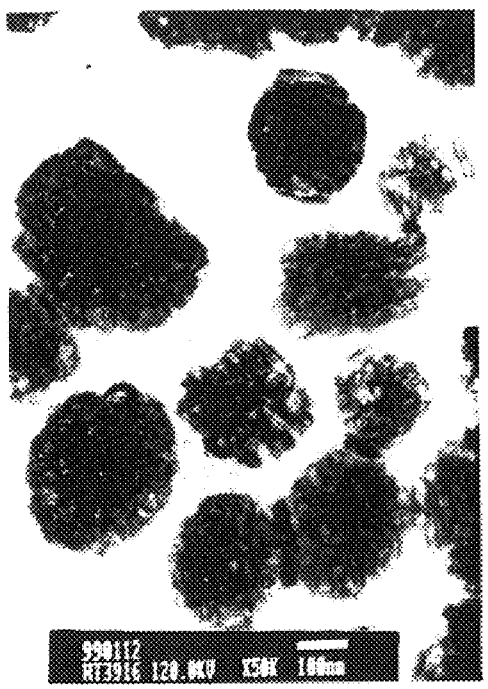

Transmission electron microscopic (TEM) image (magnification 50,000:1)is shown in FIG. 12.

Low-temperature $N_2$ adsorption-desorption isotherms are shown in FIG. 24.

X-ray diffraction crystalline phase diagram is similar to the pattern in FIG. 1.

EXAMPLE 11

The TS-1 molecular sieve obtained in Comparative Example 1 was mixed homogenously with tetraethylammonium hydroxide, ethyl amine and water in a ratio of molecular sieve (g):tetraethylammonium hydroxide (mol):ethyl amine (mol):water (mol)=100:0.15:0.10:80. Then, the mixture was transferred to a stainless steel autoclave and was shelved under autogenous pressure at 175° C. for 3 days. After cooling and pressure unloading, routine filtration, washing, drying and calcination at 550° C. in air for 3 h, the modified TS-1 molecular sieve of this invention was obtained.

Figure 13:
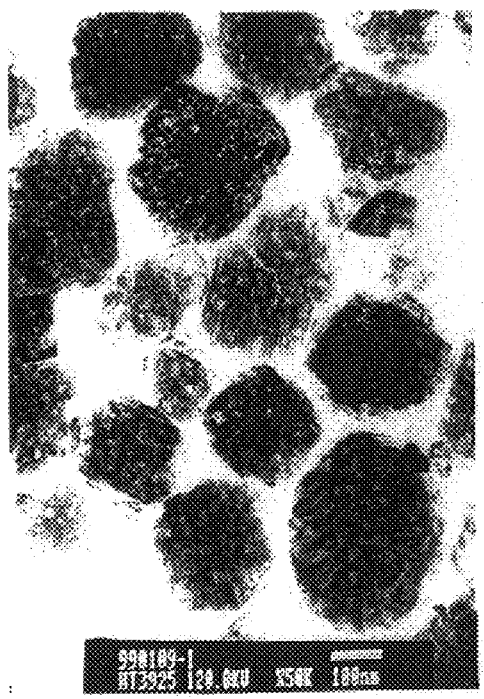

Transmission electron microscopic (TEM) image (magnification 50,000:1)is shown in FIG. 13.

Low-temperature $N_2$ adsorption-desorption isotherms are shown in FIG. 25.

X-ray diffraction crystalline phase diagram is similar to the pattern in FIG. 1.

EXAMPLE 12

This example shows the results of the catalytic oxidation when the TS-1 molecular sieve samples obtained in Comparative Examples and Examples according to the present invention were used for hydroxylation of phenol.

The reactions were carried out in a three-necked flask fitted with a condenser. The ratio of the reactants was TS-1 molecular sieve: phenol: acetone=1:20.0:16.0 by weight. The mixture was heated to 80° C., then 30 wt % hydrogen peroxide according to the ratio of phenol: $H_2O_2$=1:0.39 by weight was added in a lot with stirring. The reaction was continued at the temperature for 6 hours. The resultant products were analyzed on a Varian 3400 Chromatograph equipped with a 30 m×0.25 mm OV-101 capillary column. The results are shown in Table 1. In table 1:

Phenol conversion %=(dihydroxyl-benzene, mol+ quinone, mol)/fed phenol, mol×100%

Dihydroxy-benzene selectivity %=(catechol, mol+ Hydroquinone, mol)/converted phenol, mol×100%

Catechol selectivity %=catechol, mol/all the products, mol×100%

Hydroquinone selectivity %=hydroquinone, mol/all the products, mol×100%

Quinone selectivity %=quinone, mol/all the products, mol×100%

TABLE I

| Sample | Phenol Conversion % | Dihydroxy-benzene Selectivity % | Product Distribution % | | |
|---|---|---|---|---|---|
| | | | CAT | HQ | PBQ |
| 1 | 16.43 | 98.72 | 51.80 | 46.93 | 1.28 |
| 2 | 21.82 | 99.18 | 52.29 | 46.88 | 0.82 |
| 3 | 13.75 | 97.53 | 52.65 | 44.87 | 2.47 |
| 4 | 15.64 | 98.34 | 49.17 | 49.17 | 1.66 |
| 5 | 16.01 | 98.88 | 50.47 | 48.41 | 1.12 |
| 6 | 12.10 | 96.86 | 50.74 | 46.12 | 3.14 |
| 7 | 22.15 | 99.50 | 49.57 | 49.93 | 0.50 |
| 8 | 22.72 | 99.34 | 50.26 | 49.08 | 0.66 |
| 9 | 22.08 | 99.47 | 49.58 | 49.63 | 0.79 |
| 10 | 15.98 | 98.66 | 50.32 | 48.14 | 1.54 |
| 11 | 16.74 | 99.02 | 50.12 | 49.33 | 0.55 |
| Compar. 1 | 12.54 | 90.35 | 45.37 | 44.98 | 9.65 |

CAT: catechol, HQ: hydroquinone, PBQ: quinone

EXAMPLE 13

This example shows the activity stability in the catalytic oxidation when the TS-1 molecular sieve samples obtained in Comparative Examples and Examples were used in hydroxylation of phenol.

TS-1 molecular sieve samples obtained in Comparative Example 1 and Example 1 were extruded into cylindrical pellets with a diameter of 0.9~1.25 mm. The pellets were loaded into a fixed-bed reactor. The reactants, which had a composition of phenol: acetone: $H_2O_2$=1:1.25:0.39 by weight, were passed through the catalyst bed at 80° C. at a rate of 1.0 g phenol per hour per g catalyst under the atmospheric pressure. The samples were taken at intervals. The products were analyzed on a Varian 3400 Chromatograph equipped with a 30 m×0.25 mm OV-101 capillary column. The results are shown in Table 2. The definition of phenol conversion is the same as that in Example 12.

The results in Table 2 show that compared with the TS-1 molecular sieve obtained in comparative example 1, the TS-1 molecular sieve provided by this invention has a higher catalytic oxidation reactivity and a better activity stability. When the reaction was carried out for 160 h without any regeneration, the TS-1 molecular sieve catalyst according to the present invention kept a high catalytic reactivity, whereas the reactivity of the TS-1 of the comparative example dropped obviously. This shows that the TS-1 molecular sieve sample according to the present invention has less ex-skeleton $TiO_2$, so less tar and coke are produced and the catalyst can be scarecely deactivated. Hence, the TS-1 molecular sieve of this invention has a good stability of the catalytic reactivity.

TABLE 2

Phenol Conversion for different reaction times

| | Phenol Conversion (mol %) | |
|---|---|---|
| Reaction Time (h) | Catalyst prepared in Example 1 | Comparative catalyst |
| 1 | 21.45 | 13.55 |
| 2 | 24.63 | 15.29 |
| 7 | 24.48 | 14.34 |
| 17 | 22.14 | 13.49 |
| 19 | 22.20 | 14.16 |
| 22 | 22.55 | 12.19 |
| 25 | 22.65 | 12.19 |
| 31 | 24.58 | 10.89 |
| 33 | 24.75 | 10.49 |
| 40 | 21.37 | 8.46 |
| 43 | 21.21 | 8.19 |
| 46 | 22.18 | 9.18 |
| 49 | 23.74 | 9.09 |
| 53 | 23.89 | 7.69 |
| 56 | 23.76 | 6.19 |
| 65 | 21.06 | 5.16 |
| 70 | 22.21 | 5.09 |
| 76 | 20.43 | 4.94 |
| 79 | 20.98 | 5.14 |
| 89 | 20.23 | 4.86 |
| 92 | 20.17 | 4.61 |
| 94 | 21.12 | 4.29 |
| 96 | 20.19 | 3.99 |
| 100 | 20.11 | 3.18 |
| 120 | 20.54 | 3.07 |
| 140 | 20.41 | 2.95 |
| 160 | 20.08 | 2.94 |

What is claimed is:

1. A titanium-silicalite molecular sieve with MFI structure, characterized in that each crystallite of said molecular sieve has a hollow cavity.

2. A titanium-silicalite molecular sieve according to claim 1, wherein the radial length of said cavity in the hollow crystallite is 5–300 nm.

3. A titanium-silicalite molecular sieve according to claim 1, wherein the benzene adsorption capacity of said molecular sieve determined at 25° C. and $P/P_0$=0.10 for 1 hour is at least 70 mg/g.

4. A molecular sieve according to claim 1, wherein the grains of said molecular sieve are composed of individual hollow crystallites or aggregated crystallites resulting from aggregation of the hollow crystallites.

5. A method for preparation of said molecular sieve claimed in any one of claims 1–4, comprising mixing the synthesized MFI-type titanium-silicalite molecular sieve with an aqueous organic base solution homogenously, then subjecting the resultant mixture to a base-treatment in an autoclave at 120–200° C. under autogenous pressure for 1–192 hours, and recovering the resultant product.

6. A method according to claim 5, wherein said organic base is selected from a group consisting of aliphatic amines, alkylol amines, quaternary ammonium bases or mixtures thereof.

7. A method according to claim 6, wherein said aliphatic amines have a general formula of $R^2(NH_2)_n$, wherein $R^2$ represents a $C_{1-6}$-alkyl, and n is 1 or 2.

8. A method according to claim 7, wherein said aliphatic amine is selected from the group consisting of ethylamine, n-butyl amine, butanediamine and hexane diamine.

9. A method according to claim 6, wherein said alkylol amines have a general formula of $(HOR^3)_m N$, wherein $R^3$ represents a $C_{1-4}$-alkyl, and m is from 1 to 3.

10. A method according to claim 9, wherein said alkylol amine is selected from monoethanolamine, diethanolamine or triethanolamine.

11. A method according to claim 6, wherein said quaternaryammonium bases have a general formula of $R^4_4 NOH$, wherein $R^4$ represents a $C_{1-4}$-alkyl.

12. A method according to claim 11, wherein said quaternaryammonium base is tetrapropyl-ammonium hydroxide.

13. A method according to claim 5, wherein the ratio of molecular sieve, organic base and water is: molecular sieve (g): organic base (mol.): water (mol)=100: (0.0050–0.50): (5–200).

14. A method according to claim 13, wherein the ratio of molecular sieve, organic base and water is: molecular sieve (g): organic base (mol.): water (mol)=100: (0.010–0.15): (20–80).

15. A method according to claim 5, wherein the base-treatment is carried out at 150–180° C. under autogenous pressure for 2–120 h.

16. A method according to claim 5, further comprising repeating said steps once or several times.

17. A method according to claim 5, further comprising mixing the synthesized MFI-type of titanium-silicalite molecular sieve with an acidic compound and water homogenously, and heating the mixture at 5–95° C. for 5–360 min, before the organic-base-treatment.

18. A method according to claim 17, wherein said acidic compound is selected from organic aliphatic acids having a general formula of $R^1(COOH)_n$, wherein $R^1$ represents a $C_{1-4}$-alkyl, and n is 1 or 2.

19. A method according to claim 17, wherein said acidic compound is selected from inorganic acid compounds including hydrochloric acid, sulfuric acid, phosphoric acid, nitric acid and/or hydrofluoric acid.

20. A method according to claim 17, wherein said acidic compound is selected from acidic salt compounds including ammonium chloride, ammonium phosphate, ammonium nitrate, ammonium sulfate and/or ammonium fluoride.

21. A method according to claim 17, wherein the ratio of molecular sieve, acidic compound and water is: molecular sieve (g): acidic compound (mol): water (mol)=100: (0.010–2.0): (5–250).

22. A method according to claim 18, wherein the ratio of molecular sieve, acidic compound and water is: molecular sieve (g): acidic compound (mol): water (mol)=100: (0.080–0.80): (10–100).

23. A method according to claim 17, wherein said acid-treatment is carried out at 15–60° C. for 10–180 min.

* * * * *